(12) United States Patent
Kim et al.

(10) Patent No.: US 12,445,156 B2
(45) Date of Patent: Oct. 14, 2025

(54) TURBO DECODER, OPERATING METHOD THEREOF, AND ELECTRONIC DEVICE INCLUDING TURBO DECODER

(71) Applicant: SAMSUNG ELECTRONICS CO., LTD., Suwon-si (KR)

(72) Inventors: Joohan Kim, Suwon-si (KR); Hoil Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 18/499,625

(22) Filed: Nov. 1, 2023

(65) Prior Publication Data
US 2024/0146348 A1 May 2, 2024

(30) Foreign Application Priority Data
Nov. 2, 2022 (KR) .................. 10-2022-0144729

(51) Int. Cl.
*H04B 1/10* (2006.01)
*H03M 13/29* (2006.01)
*H04L 1/00* (2006.01)

(52) U.S. Cl.
CPC ...... *H04B 1/1027* (2013.01); *H03M 13/2957* (2013.01); *H04L 1/0061* (2013.01)

(58) Field of Classification Search
CPC ............... H04B 7/0413; H04B 1/1027; H03M 13/2957; H03M 13/3746; H03M 13/3784; H03M 13/45; H03M 13/09; H03M 13/2966; H03M 13/2975; H03M 13/1125; H03M 13/2771; H03M 13/63; H03M 13/258; H03M 13/2948; H03M 13/31; H03M 13/6519; H03M 13/6522; H03M 13/296; H04L 1/0045; H04L 1/005; H04L 1/0061;
(Continued)

(56) References Cited

U.S. PATENT DOCUMENTS 6,999,530 B2   2/2006   Huang et al.
7,234,095 B2   6/2007   Lee et al.
(Continued)

OTHER PUBLICATIONS

Li, Y., et al., "Reduced-Complexity Soft MIMO Detection Based on Casual and Noncasual Decision Feedback", in IEEE Transactions on Signal Processing, vol. 56, No. 3, Mar. 2008, pp. 1178-1187.
(Continued)

*Primary Examiner* — Betsy Deppe
(74) *Attorney, Agent, or Firm* — Morgan, Lewis & Bockius LLP

(57) ABSTRACT

A turbo decoder includes a first soft input soft output (SISO) decoder configured to receive systematic information, first parity information, and a first pre-log likelihood ratio (LLR), and to output a first parity LLR obtained by calculating an LLR for the first parity information, a first interleaver configured to interleave the systematic information, a second SISO decoder configured to receive an output of the first interleaver, second parity information, and a second pre-LLR, and to output a second parity LLR obtained by calculating an LLR for the second parity information, and an interference canceller configured to receive the first parity LLR from the first SISO decoder, receive the second parity LLR from the second SISO decoder, and calculate a first update parity LLR and a second update parity LLR.

20 Claims, 11 Drawing Sheets

(58) Field of Classification Search
CPC ... H04L 1/0052; H04L 1/0054; H04L 1/0055; H04L 25/0328; H04L 25/03286
See application file for complete search history.

(56) References Cited

U.S. PATENT DOCUMENTS

| | | | | |
|---|---|---|---|---|
| 7,810,014 | B2* | 10/2010 | Kim | H03M 13/09 |
| | | | | 714/758 |
| 7,831,886 | B2* | 11/2010 | Shin | H03M 13/2957 |
| | | | | 714/755 |
| 7,886,209 | B2* | 2/2011 | Orio | H03M 13/2975 |
| | | | | 714/755 |
| 8,098,774 | B1 | 1/2012 | Sarrigeorgidis et al. | |
| 8,601,355 | B2* | 12/2013 | Purkovic | H03M 13/2957 |
| | | | | 714/796 |
| 8,908,496 | B2 | 12/2014 | Kadous | |
| 8,976,903 | B2 | 3/2015 | Subrahmanya et al. | |
| 2004/0062302 | A1 | 4/2004 | Fujii et al. | |
| 2006/0188044 | A1 | 8/2006 | Wang et al. | |

OTHER PUBLICATIONS

Chall, et al., "Iterative receivers combining MIMO detection with turbo decoding: performance-complexity trade-offs", EURASIP Journal on Wireless Communications and Networking (Mar. 12, 2015) 2015:69, pp. 1-19.

* cited by examiner

TURBO DECODER, OPERATING METHOD THEREOF, AND ELECTRONIC DEVICE INCLUDING TURBO DECODER

CROSS-REFERENCE TO RELATED APPLICATION

This application is based on and claims priority under 35 U.S.C. § 119 to Korean Patent Application No. 10-2022-0144729, filed on Nov. 2, 2022, in the Korean Intellectual Property Office, the disclosure of which is incorporated by reference herein in its entirety.

Technical Field

This disclosure relates to a decoder, and more particularly, to a turbo decoder, an operating method thereof, and an electronic device including the turbo decoder.

Discussion of Related Art

A great deal of effort has gone into developing and commercializing $5^{th}$ generation (5G)/pre-5G communication systems in recent years (5G is often called new radio (NR) in the 3GPP standard). The advent of 5G is intended to meet the growing demand for wireless data traffic and overcome the shortcomings of $4^{th}$ generation (4G) communication systems.

To achieve high data transmission rates, 5G communication systems have been considered for implementation in ultra-high frequency (mmWave) bands (e.g., a 28 Giga (28 GHz) band, a 39 Giga (39 GHz) band, and the like). Beamforming, massive multiple input multiple output (MIMO), full dimensional MIMO (FD-MIMO), array antennas, analog beam-forming, hybrid beam-forming, and large scale antenna technologies have been discussed in 5G communication systems to mitigate the path loss of radio waves and increase the propagation distance of radio waves, in ultra-high frequency bands.

A turbo coding/decoding approach is sometimes used to correct data errors that occur in noisy channels such as MIMO based systems. Turbo coding may involve the generation and transmission of three sets of data: payload data (sometimes called systematic information), a first set of parity bits for the payload data, and a second set of parity bits for a known interleaving (permutation) of the payload data. The data sets are represented by modulated symbols and transmitted. After demodulation on the receiver side, a turbo decoder may implement soft decision decoding utilizing probabilities (log likelihood ratios (LLRs)) as to what binary number a received symbol may represent (e.g., a 1 or a 0 or a multi-bit combination). For example, a first decoder in the turbo decoder may make soft decisions outputting LLRs, and a second decoder may receive the LLRs as inputs to make a hard decision for generating final output data.

SUMMARY

Embodiments of the inventive concept provide a turbo decoder that cancels interference between layers (independent data streams) of a MIMO channel in a process of performing turbo decoding by including an interference canceller therein, an operating method thereof, and an electronic device including the turbo decoder.

According to an aspect of the inventive concept, there is provided a turbo decoder including a first soft input soft output (SISO) decoder configured to receive systematic information, first parity information, and a first pre-log likelihood ratio (LLR), and to output a first parity LLR obtained by calculating an LLR for the first parity information, a first interleaver configured to interleave the systematic information, a second SISO decoder configured to receive an output of the first interleaver, second parity information, and a second pre-LLR, and to output a second parity LLR obtained by calculating an LLR for the second parity information, and an interference canceller configured to receive the first parity LLR from the first SISO decoder, receive the second parity LLR from the second SISO decoder, and calculate a first update parity LLR and a second update parity LLR. The turbo decoder uses the first and second update LLRs to derive decoded output data corresponding to the systematic information.

According to another aspect of the inventive concept, there is provided a turbo decoder included in a reception device of a multiple input multiple output communication system, including a first SISO decoder configured to receive systematic information, first parity information, and a first pre-log likelihood ratio (LLR), and to output a first parity LLR obtained by calculating an LLR for the first parity information, a first interleaver configured to interleave the systematic information, a second SISO decoder configured to receive an output of the first interleaver, second parity information, and a second pre-LLR, and to output a second parity LLR obtained by calculating an LLR for the second parity information, a first interference canceller configured to receive the first parity LLR from the first SISO decoder, receive the second parity LLR from the second SISO decoder, and calculate a first update parity LLR and a second update parity LLR, and a second interference canceller configured to receive the first parity LLR from the first SISO decoder, receive the second parity LLR from the second SISO decoder, and calculate a third update parity LLR and a fourth update parity LLR. The turbo decoder uses the first through fourth update LLRs to derive decoded output data corresponding to the systematic information.

According to an aspect of the inventive concept, there is provided an operating method of a turbo decoder including a first SISO decoder, a second SISO decoder, and an interference canceller, including receiving, by the first SISO decoder, first parity information, first systematic information, and a first pre-LLR, providing, to the interference canceller by the first SISO decoder, a first parity LLR generated by calculating an LLR for the first parity information, providing, to the interference canceller by the second SISO decoder, a second parity LLR generated by calculating an LLR for second parity information on the basis of received second parity information and second systematic information, obtaining a first extrinsic LLR by subtracting the first pre-LLR from a first post-LLR which is an output of the first SISO decoder, generating, by the interference canceller, a first update parity LLR and a second update parity LLR on the basis of the first parity LLR and the second parity LLR, and providing, by the interference canceller, the first update parity LLR to the first SISO decoder and providing the second update parity LLR to the second SISO decoder.

BRIEF DESCRIPTION OF THE DRAWINGS

Embodiments will be more clearly understood from the following detailed description taken in conjunction with the accompanying drawings in which.

DETAILED DESCRIPTION OF EMBODIMENTS

Hereinafter, embodiments will be described in detail with reference to the accompanying drawings.

Herein, once an element, signal, etc. is introduced by a name followed by a label, the element may be later referred to interchangeably by a shortened version of the name followed by the label, or by just the label (e.g., "first extrinsic LLR SIG3" may be later referred to as just "SIG3").

Figure 1:
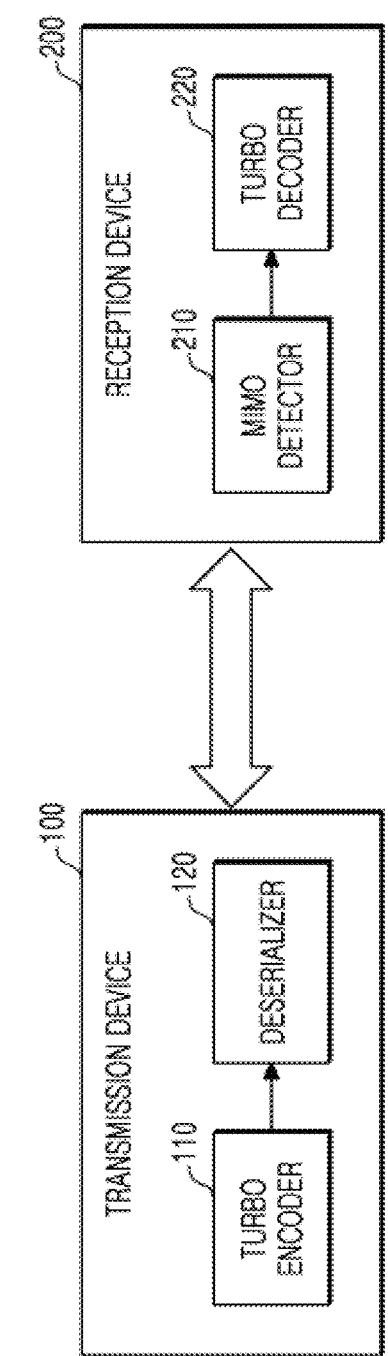
FIG. 1 illustrates a wireless communication system according to an embodiment.

FIG. 1 illustrates a wireless communication system, 10, according to an embodiment. The wireless communication system 10 may include a transmission device 100 and a reception device 200. The transmission device 100 may refer to a device for encoding data and transmitting a signal through a wireless channel. For example, when the signal is an uplink signal, the transmission device 100 may correspond to user equipment (UE), and the reception device 200 may correspond to a base station. When the signal is a downlink signal, the transmission device 100 may correspond to a base station, and the reception device 200 may correspond to UE.

The transmission device 100 may include a turbo encoder 110 and a deserializer 120. The turbo encoder 110 may encode data according to a turbo code technique. For example, the turbo encoder 110 may perform encoding by applying the same sequence to two or more component encoders according to different arrays to concatenate convolutional codes in parallel. The deserializer 120 may deserialize a serial bit string. The deserializer 120 may receive a bit string of an encoded codeword from the turbo encoder 110, and may deserialize the serial bit string by the number of multiple inputs. For example, the deserializer 120 may deserialize the serial bit string and map the deserialized bit string to each of a plurality of layers (independent data streams). Each of the plurality of layers may correspond to a respective rank of multiple input multiple output (MIMO). For example, when the wireless communication system 10 corresponds to a 4×4 MIMO wireless communication system, the serial bit string may be deserialized into four bit strings.

The reception device 200 may include a MIMO detector 210 and a turbo decoder 220. The MIMO detector 210 may detect a MIMO signal. The MIMO detector 210 may generate soft decision information in a process of detecting the MIMO signal to perform error correction via the turbo decoder 220. For example, the MIMO detector 210 may be based on a linear detection technique using a minimum mean squared error (MMSE), zero-forcing (ZF), and a matched filter (MF), or may be based on a nonlinear detection technique applying a maximum likelihood (ML). The turbo decoder 220 may be a decoder having a parallel structure based on a maximum a posteriori (MAP) algorithm.

Figure 2:
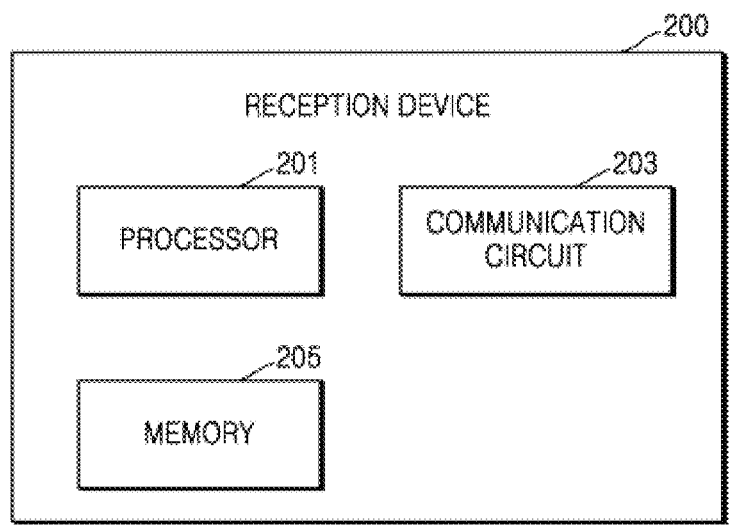
FIG. 2 is a block diagram of an electronic device according to embodiments.

FIG. 2 is a block diagram of a reception device 200 according to embodiments.

Referring to FIG. 2, the reception device 200 may include a processor 201, a communication circuit 203, and a memory 205.

The processor 201 may control all operations of the reception device 200. For example, the processor 201 may transmit and receive signals through the communication circuit 203. In addition, the processor 201 may record data in and read data from the memory 205. A portion of the communication circuit 203 and the processor 201 may be referred to as a communication processor (CP).

The communication circuit 203 performs functions for transmitting and receiving signals through a wireless channel. For example, the communication circuit 203 performs a conversion function between a baseband signal and a bit string, according to a physical layer standard of a system. For example, the communication circuit 203 may generate complex symbols by encoding and modulating a transmission bit string when transmitting data, and may restore a reception bit string by demodulating and decoding a baseband signal when receiving data. In addition, the communication circuit 203 may up-convert a baseband signal into a radio frequency (RF) band signal and transmit the RF band signal through an antenna, or may down-convert, into a baseband signal, an RF band signal received through the antenna. For example, the communication circuit 203 may include a transmission filter, a reception filter, an amplifier, a mixer, an oscillator, a digital-to-analog converter (DAC), an analog-to-digital converter (ADC), and the like. The communication circuit 203 may perform beamforming. The communication circuit 203 may apply a beamforming weight to a signal to impart directionality to a signal to be transmitted and received. In a MIMO based application, the communication circuit 203 may receive a spatially multiplexed MIMO signal through the MIMO detector 210 and acquire an error-corrected bit string through the turbo decoder 220.

The memory 205 may store data, such as a basic program, an application program, and setup information for an operation of the reception device 200. The memory 205 may include a volatile memory, a nonvolatile memory, or a combination of a volatile memory and a nonvolatile memory. The memory 205 may provide stored data according to a request from the processor 201.

Figure 3:
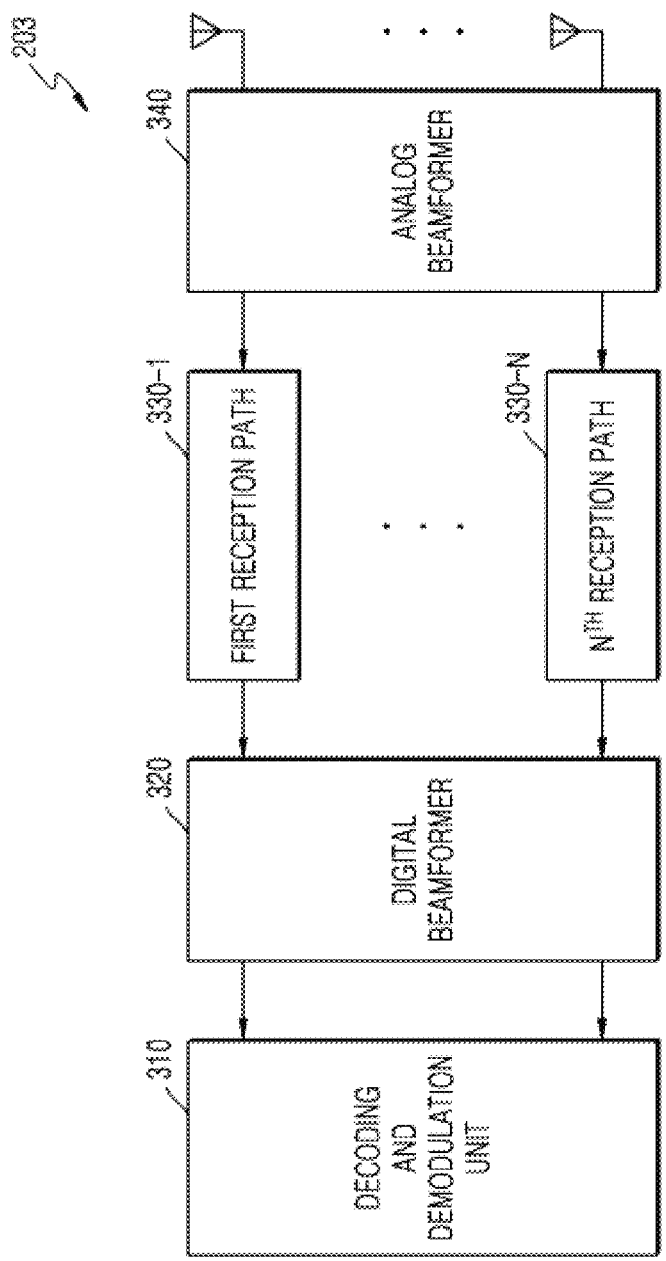
FIG. 3 is a detailed block diagram of a communication circuit according to embodiments.

FIG. 3 is a detailed block diagram of a communication circuit according to embodiments.

Referring to FIG. 3, a communication circuit 203 may include a decoding and demodulation unit 310, a digital beamformer 320, a first reception path 330-1 to an $N^{th}$ reception path 330-N, and an analog beamformer 340.

According to embodiments, the decoding and demodulation unit 310 may perform channel decoding. At least one of a low density parity check (LDPC) code, a convolutional code, a polar code, and a turbo code may be used for channel decoding. For example, the decoding and demodulation unit 310 may correspond to the turbo decoder 220 of the reception device 200 in FIG. 1.

The digital beamformer 320 multiplies analog signals received through the first reception path 330-1 to the N$^{th}$ reception path 330-N by beamforming weights. Here, the beamforming weights are used to change the magnitude and phase of a signal. Here, modulated symbols, which are multiplexed according to a MIMO transmission technique, may be received via the first reception path 330-1 to the N$^{th}$ reception path 330-N.

The analog beamformer 340 performs beamforming on an analog signal. The analog beamformer 340 may perform beamforming on an analog reception beam to receive a MIMO signal.

Each of the first reception path 330-1 to the N$^{th}$ reception path 330-N may include a fast Fourier transform (FFT) operation unit, an ADC, a CP canceller, a serial-parallel converter, and a down converter. Each of the first reception path 330-1 to the N$^{th}$ reception path 330-N may down-convert a received signal into a baseband frequency, generate a serial time domain baseband signal by canceling a cyclic prefix (CP), convert the serial time domain baseband signal into parallel time domain signals, generate N parallel frequency domain signals by performing an FFT algorithm, and convert the parallel frequency domain signals into a sequence of modulated data symbols. In other words, the first reception path 330-1 to the N$^{th}$ reception path 330-N may provide independent signal processing processes for a plurality of streams generated via digital beamforming. However, according to implementation methods, some of components of the first reception path 330-1 to the N$^{th}$ reception path 330-N may be used in common.

Figure 4:
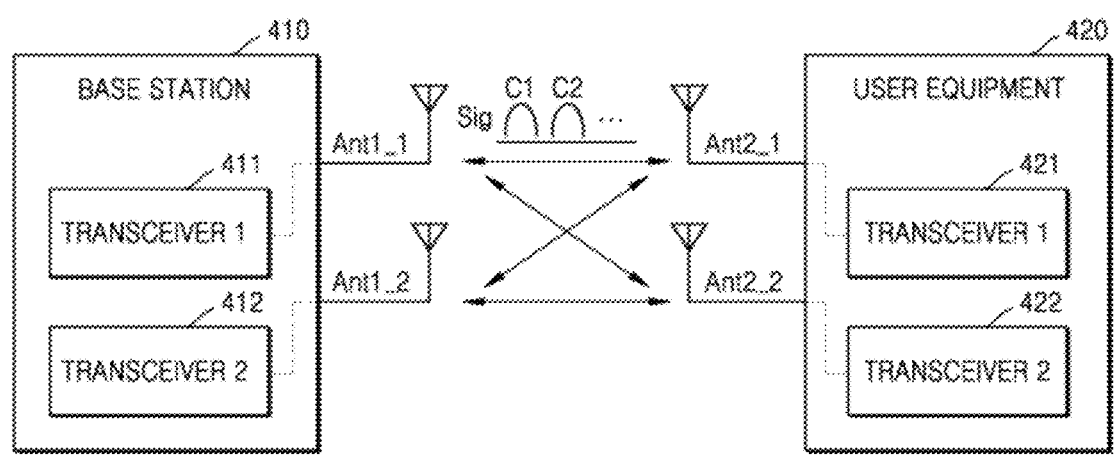
FIG. 4 illustrates a multiple input multiple output (MIMO) environment according to embodiments.

FIG. 4 illustrates a MIMO environment according to embodiments.

Referring to FIG. 4, a base station 410 and a user equipment (UE) 420 may communicate with each other by using a MIMO method. Accordingly, the base station 410 and the user equipment 420 may respectively include a plurality of antennas Ant_1 and Ant1_2 and Ant2_1 and Ant2_2. As illustrated in FIG. 4, the base station 410 and the user equipment 420 respectively include two antennas Ant_1 and Ant1_2 and Ant2_1 and Ant2_2, but are not limited thereto. Aspects of the inventive concept may also be applied to an embodiment in which each of the base station 410 and the user equipment 420 includes two or more antennas.

The base station 410 may include a first transceiver 411, a second transceiver 412, a first antenna Ant1_1, and a second antenna Ant1_2. Each of the first transceiver 411 and the second transceiver 412 may be connected to one antenna. For example, the first transceiver 411 may be connected to the first antenna Ant1_1, and the second transceiver 412 may be connected to the second antenna Ant1_2. When the base station 410 operates as a transmission device, the first transceiver 411 and the second transceiver 412 may operate as transmitters, and when the base station 410 operates as a reception device, the first transceiver 411 and the second transceiver 412 may operate as receivers.

The first transceiver 411 may generate a first signal Sig by combining a first component carrier signal C1 and a second component carrier signal C2 in a transmission mode, and may transmit the generated first signal Sig to the user equipment 420. In a receive mode, the first transceiver 411 may extract, from a similar first signal Sig received from the UE 420, both the first and second component carrier signals C1 and C2. The second transceiver 412 may perform the same operations. Thus, each of the first transceiver 411 and the second transceiver 412 may combine and transmit a plurality of component carrier signals, and may extract a plurality of component carrier signals from the first signal Sig.

The user equipment 420 may include a third transceiver 421, a fourth transceiver 422, a third antenna Ant2_1, and a fourth antenna Ant2_2. Substantially the same or similar functionality of the base station 410 discussed above may be applied to the UE, and thus, a description thereof in UE 420 is omitted herein.

Figure 5:
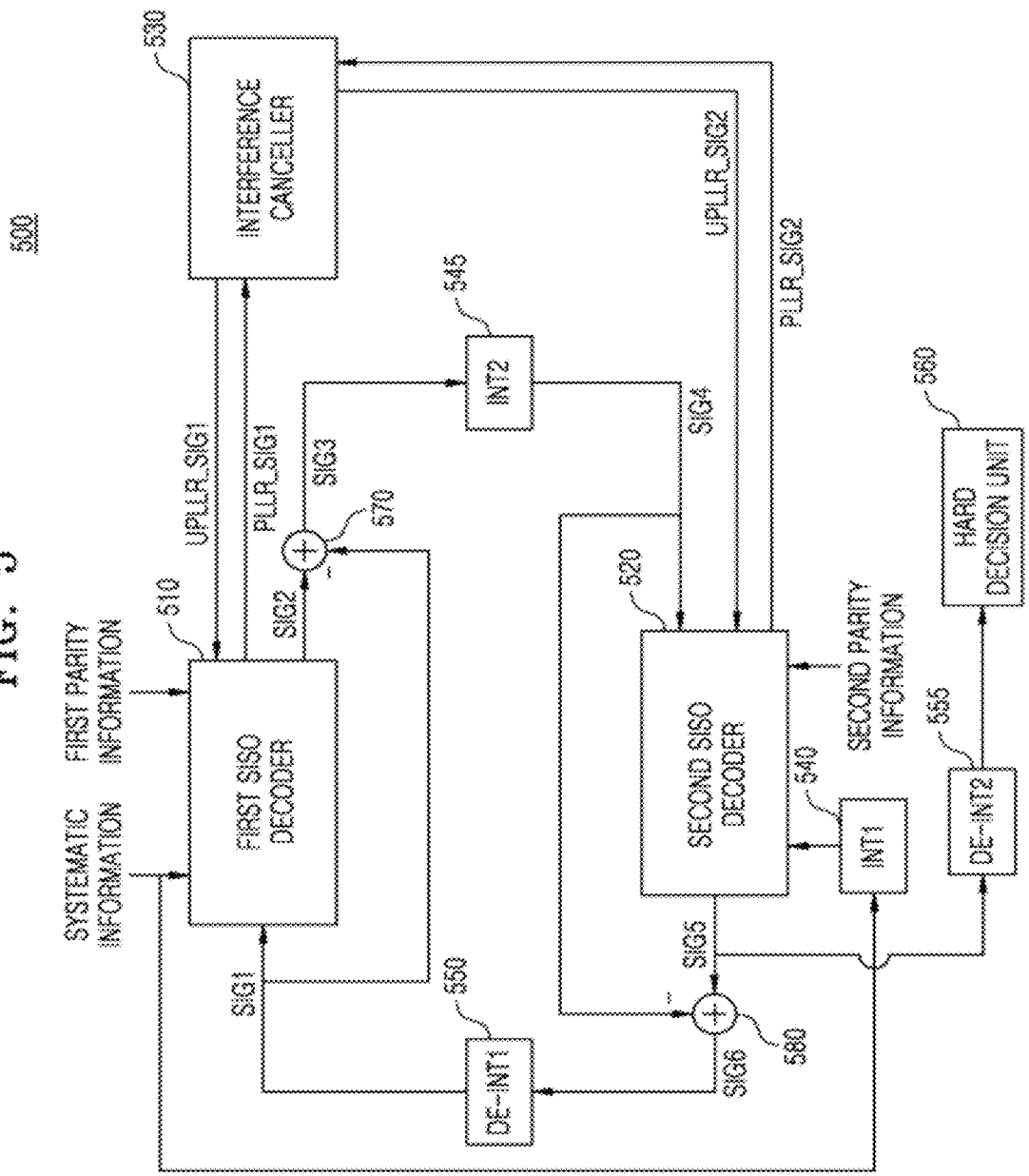
FIG. 5 is a block diagram of a turbo decoder including an interference canceller, according to embodiments.

FIG. 5 is a block diagram of a turbo decoder 500 including an interference canceller 530, according to embodiments.

Referring to FIG. 5, the turbo decoder 500 may include a first soft input soft output (SISO) decoder 510, a second SISO decoder 520, the interference canceller 530, a first interleaver 540, a second interleaver 545, a first de-interleaver 550, a second de-interleaver 555, a first subtractor 570, a second subtractor 580, and a hard decision unit 560. Each of the first SISO decoder 510 and the second SISO decoder 520 may calculate a soft output.

The first SISO decoder 510 may receive systematic information, first parity information, and a first "pre-log likelihood ratio (pre-LLR)" SIG1. The systematic information may be a systematic bitstream (e.g., a "systematic code"), which may be a bitstream of an error correcting code (ECC) in which original data is embedded in the encoded output. The first pre-LLR SIG1 may be the same as a second extrinsic LLR SIG6 (after SIG6 is de-interleaved through the first de-interleaver 550). SIG6 may be an LLR corresponding to the systematic information interleaved by the interleaver 540. SIG6 may be a difference between a second pre-LLR SIG4, which is an input of the second SISO decoder 520, and a second post-LLR SIGS which is an output of the second SISO decoder 520, where the difference is computed by the second subtractor 580. When the turbo decoder 500 first starts decoding, the first pre-LLR SIG1 may be 0. When the turbo decoder 500 repeatedly performs decoding at least once, the first pre-LLR SIG1 may not be 0. The first SISO decoder 510 may generate and output two LLRs on the basis of the received systematic information, first parity information, and first pre-LLR SIG1. The first LLR of the two LLRs is a first "parity LLR" PLLR_SIG1 for the first parity information on the basis of the systematic information and the first parity information. The first parity LLR PLLR_SIG1 may be provided to the interference canceller 530. The second of the two LLRs is a first "post-LLR" SIG2 which is generated on the basis of the first pre-LLR SIG1, the systematic information, and the first update parity LLR. Here, the first post-LLR SIG2 may be output on the basis of Equation 1 below.

$$L_{app}(b_k) = L_{ext}(b_k) + L_{apri}(b_k) \qquad \text{[Equation 1]}$$

Here, $L_{app}(b_k)$ is the first post-LLR SIG2, which is an output of the first SISO decoder 510, and $L_{apri}(b_k)$ is the first pre-LLR SIG1, which is the input of the first SISO decoder 510. Accordingly, the extrinsic LLR SIG3 for the first SISO decoder 510 may be represented as $L_{ext}(b_k)$, which may be expressed as in Equation 2 below.

$$L_{ext}(b_k) = L_{app}(b_k) - L_{apri}(b_k). \qquad \text{[Equation 2]}$$

Thus, the first extrinsic LLR SIG3, which is the extrinsic LLR for the first SISO decoder 510, may be obtained by the first subtractor 570 subtracting an input LLR (the first pre-LLR SIG1) from an output LLR of the first SISO decoder 510. The first extrinsic LLR SIG3 may correspond to a systematic LLR at a point in time when decoding by the first SISO decoder 510 is completed. The first extrinsic LLR SIG3 may be interleaved via the second interleaver 545 and then input as the second pre-LLR SIG4 to the second SISO decoder 520.

The second SISO decoder 520 may receive second parity information, the second pre-LLR SIG4, and systematic information. Here, the systematic information input into the second SISO decoder 520 may be a systematic bitstream obtained by interleaving the systematic information input into the first SISO decoder 510. For example, the second SISO decoder 520 may receive systematic information that is interleaved via the first interleaver 540. The second parity information may be different from the first parity information input into the first SISO decoder 510. The second SISO decoder 520 may output an LLR (hereinafter, a second parity LLR) PLLR_SIG2 for the second parity information on the basis of the systematic information and the second parity information. The second parity LLR PLLR_SIG2 may be generated by the second SISO decoder 520 and provided to the interference canceller 530.

The interference canceller 530 may update a parity LLR. The updated parity LLR may be an LLR calculated by canceling inter-layer interference. The interference canceller 530 may receive the first parity LLR PLLR_SIG1 from the first SISO decoder 510 and receive the second parity LLR PLLR_SIG2 from the second SISO decoder 520. The interference canceller 530 may calculate updated LLRs on the basis of the first parity LLR PLLR_SIG1 and the second parity LLR PLLR_SIG2, respectively. For example, the interference canceller 530 may generate a first update parity LLR UPLLR_SIG1 and provide the generated first update parity LLR UPLLR_SIG1 to the first SISO decoder 510, and may generate a second update parity LLR UPLLR_SIG2 and provide the generated second update parity LLR UPLLR_SIG2 to the second SISO decoder 520.

The second SISO decoder 520 may output the second post-LLR SIG5. The second SISO decoder 520 may calculate the second post-LLR SIG5 on the basis of the systematic information interleaved via the first interleaver 540, the second update parity LLR UPLLR_SIG2, and the second pre-LLR SIG4. As in Equation 1, the second extrinsic LLR SIG6 for the second SISO decoder 520 may be obtained by subtractor 580 subtracting the second pre-LLR SIG4, which is an input LLR of the second SISO decoder 520, from the second post-LLR SIG5 which is an output LLR of the second SISO decoder 520. The second extrinsic LLR SIG6 may correspond to a systematic LLR at a point in time when decoding by the second SISO decoder 520 is completed. The second extrinsic LLR SIG6 may be interleaved again via the first de-interleaver 550 according to a reverse order of an interleaving sequence performed by the second interleaver 545. The second extrinsic LLR SIG6 passing through the first de-interleaver 550 may be input as the first pre-LLR SIG1 which is an input LLR of the first SISO decoder 510.

The second post-LLR SIG5, which is the output of the second SISO decoder 520, may be interleaved again via the second de-interleaver 555 according to the reverse order of an interleaved sequence. Subsequently, the de-interleaved second post-LLR SIG5 may be input into the hard decision unit 560 to generate a decoded signal. The decoded signal may include decoded output data corresponding to the original data embedded in the systematic information.

Figure 6:
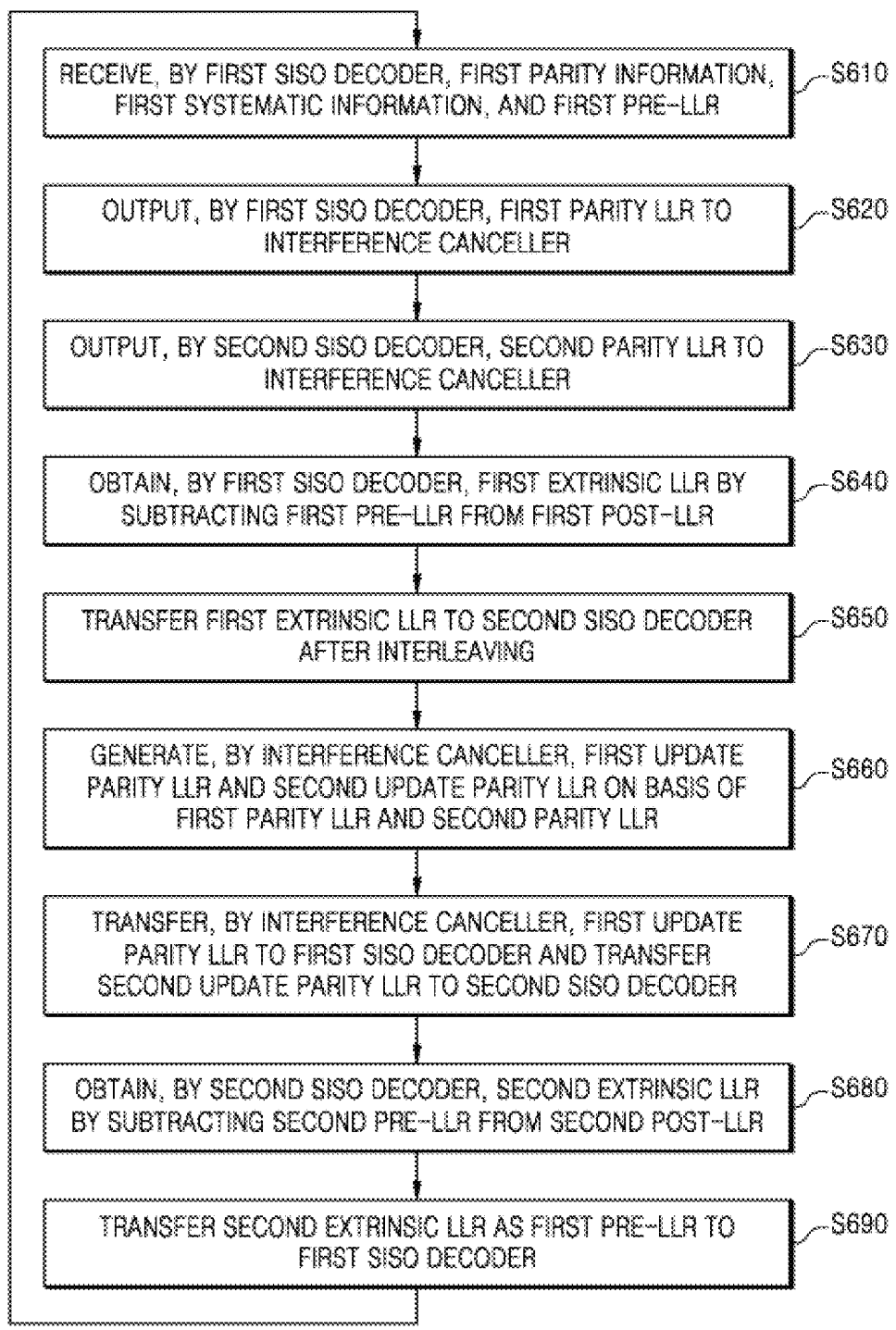
FIG. 6 is a flowchart illustrating an operation of a turbo decoder, according to embodiments.

FIG. 6 is a flowchart illustrating an operation of a turbo decoder, according to embodiments.

Referring to FIGS. 5 and 6, in operation S610, the first SISO decoder 510 may receive first parity information, first systematic information, and a first pre-LLR SIG1. SIG1 may be obtained by de-interleaving an extrinsic LLR (e.g., a second post-LLR SIG6) of the second SISO decoder 520. When the turbo decoder 500 first performs decoding, SIG1 may be 0.

In operation S620, the first SISO decoder 510 may output a first parity LLR PLLR_SIG1 to the interference canceller 530. The first SISO decoder 510 may calculate the first parity LLR PLLR_SIG1 on the basis of the received first systematic information, first parity information, and first pre-LLR SIG1.

In operation S630, the second SISO decoder 520 may output a second parity LLR PLLR_SIG2 to the interference canceller 530. The second SISO decoder 520 may receive second systematic information, second parity information, and a second pre-LLR SIG4 and generate the second parity LLR PLLR_SIG2 on the basis of the second systematic information, the second parity information, and the second pre-LLR SIG4. The second pre-LLR SIG4 may be obtained by interleaving a first extrinsic LLR SIG3. In detail, the second pre-LLR SIG4 may be obtained by subtracting an input LLR (e.g., the first pre-LLR SIG1) of the first SISO decoder 510 from an output LLR (e.g., a first post-LLR SIG2) of the first SISO decoder 510 and interleaving via the second interleaver 545. The second systematic information may be a bitstream obtained by interleaving the first systematic information. The second parity information may be different from the first parity information. The second SISO decoder 520 may output the generated second parity LLR PLLR_SIG2 to the interference canceller 530.

In operation S640, the first SISO decoder 510 may obtain the first extrinsic LLR SIG3 by subtracting the first pre-LLR SIG1 from the first post-LLR SIG2. The first extrinsic LLR SIG3 may refer to an LLR for systematic information received by the first SISO decoder 510.

In operation S650, the first extrinsic LLR SIG3 may be transferred (after it is interleaved) to the second SISO decoder 520. Here, the first extrinsic LLR SIG3 may be interleaved via the second interleaver 545 and input into the second SISO decoder 520. The interleaved first extrinsic LLR SIG3 may be provided to the second SISO decoder 520 as the second pre-LLR SIG4 of the second SISO decoder 520.

In operation S660, the interference canceller 530 may generate a first update parity LLR UPLLR_SIG1 and a second update parity LLR UPLLR_SIG2 on the basis of the first parity LLR PLLR_SIG1 and the second parity LLR PLLR_SIG2. Each of the first update parity LLR UPLLR_SIG1 and the second update parity LLR UPLLR_SIG2 may be an LLR recalculated after canceling inter-layer interference of a MIMO signal.

For example, the result $y_n$ of canceling interference for an $n^{th}$ layer ($n^{th}$ independent data stream) in a MIMO channel model may be expressed as in Equation 3 below.

$$y_n = h_0(x_0 - \bar{x}_0) + \ldots + h_n x_n + \ldots h_{N-1}(x_{N-1} - \bar{x}_{N-1}) + w \quad \text{[Equation 3]}$$

Here, represents noise and may be additive white Gaussian noise (AWGN); $h_0, h_1, \ldots, h_{N-1}$ are elements of a channel matrix H in the MIMO channel model, and x and y are transmit and receive vectors, respectively, in the MIMO channel model. An average "x bar" of an $n^{th}$ symbol may be expressed as in Equation 4 below.

$$\bar{x}_n = E[x_n] = \sum x Pr(x_n = x) \quad \text{[Equation 4]}$$

-continued $$Pr(x_n = x) = \prod_{i=0}^{M-1} Pr(x_n^i = x^i), M \text{ is modulation order}$$

Here, M represents a modulation order. The interference canceller 530 may perform a multiplication operation on the result of the interference cancellation in Equation 3 above by a minimum mean square error (MMSE) coefficient to calculate a newly updated LLR (an "update parity LLR"). The MMSE coefficient may be expressed as in Equation 5 below.

$$g_n = \left(H\Delta_n H^H + \frac{\sigma^2}{E_s}I\right)^{-1} h_n \quad [\text{Equation 5}]$$

Here, $\Delta_n$ is a diagonal matrix including variance of transmission symbols.

In operation S670, the interference canceller 530 may transmit the first update parity LLR UPLLR_SIG1 to the first SISO decoder 510 and transmit the second update parity LLR UPLLR_SIG2 to the second SISO decoder 520. The first SISO decoder 510 and the second SISO decoder 520 may receive the first update parity LLR UPLLR_SIG1 and the second update parity LLR UPLLR_SIG2, respectively, and may repeatedly calculate the first extrinsic LLR SIG3 and the second extrinsic LLR SIG6 corresponding to a systematic LLR, on the basis of the first update parity LLR UPLLR_SIG1 and the second update parity LLR UPLLR_SIG2.

In operation S680, the second SISO decoder 520 may obtain the second extrinsic LLR SIG6 by subtracting the second pre-LLR SIG4 from the second post-LLR SIGS. In this case, the second extrinsic LLR SIG6 may refer to an LLR for systematic information received by the second SISO decoder 520.

In operation S690, the second extrinsic LLR SIG6 may be transferred to the first SISO decoder 510. The second extrinsic LLR SIG6 may be de-interleaved via the first de-interleaver 550 and input into the first SISO decoder 510. The de-interleaved second extrinsic LLR SIG6 may be provided as the first pre-LLR SIG1 of the first SISO decoder 510. According to an embodiment, the turbo decoder 500 may repeatedly perform decoding by returning to operation S610 in response to completion of operation S690.

Figure 7:
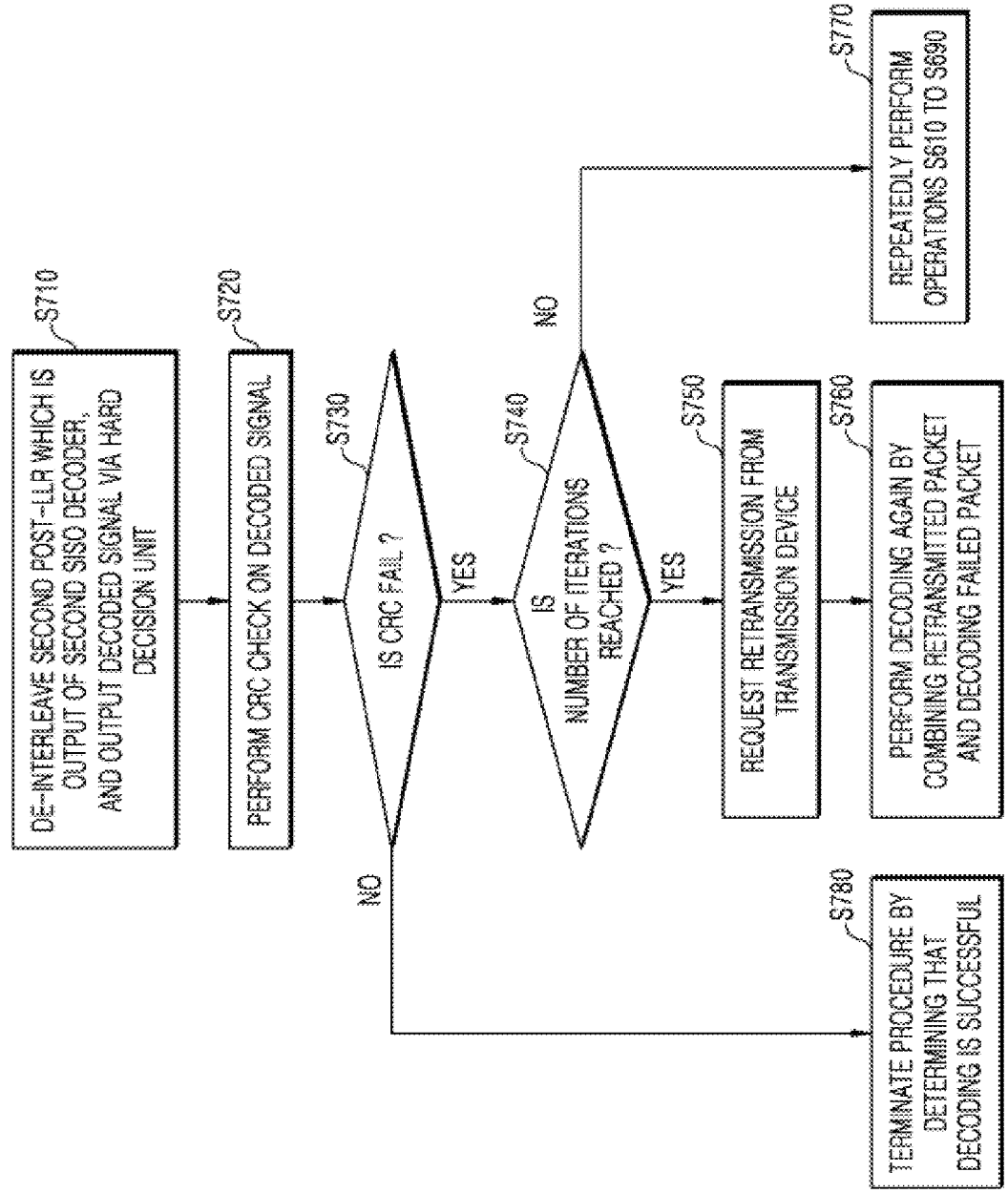
FIG. 7 is a flowchart illustrating an operating method of an electronic device, according to embodiments.

FIG. 7 is a flowchart illustrating an operating method of the reception device 200, according to embodiments.

Referring to FIG. 7, in operation S710, a second post-LLR SIGS, which is an output of the second SISO decoder 520, may be de-interleaved, and a decoded signal may be output via the hard decision unit 560. The turbo decoder 500 may de-interleave the second post-LLR SIGS by using the second de-interleaver 555. The de-interleaved second post-LLR SIGS may be input into the hard decision unit 560 to generate the decoded signal. The decoded signal may be used to determine whether or not a cyclic redundancy check (CRC) parity check is satisfied. The decoded signal may include decoded output data corresponding to the original data embedded in the systematic information.

In operation S720, the reception device 200 may perform a CRC check on the decoded signal. The reception device 200 may calculate a CRC value on the basis of the generated decoded signal and determine whether or not the calculated CRC value matches a CRC value included in the decoded signal.

When the CRC check is not a fail in operation S730, i.e., when the CRC check is successful, in operation S780, the reception device 200 may determine that decoding is successful and terminate the procedure. When the CRC check is a fail, the reception device 200 may check the maximum number of iterations for determining that the decoding fails.

In operation S740, the reception device 200 may determine whether or not the maximum number of iterations has been reached. The reception device 200 may increase the number of iterations whenever operations S610 to S690 of FIG. 6 are repeated. For example, the reception device 200 may further include a counter (not shown) for counting the number of iterations. When the maximum number of iterations is not reached, the reception device 200 may repeatedly perform operations S610 to S690 by proceeding to operation S770.

In operation S750, the reception device 200 may request retransmission from the transmission device 100. The reception device 200 repeatedly performs decoding until the maximum number of iterations is reached, but may determine that the decoding fails because the CRC check fails. Accordingly, the reception device 200 may request the transmission device 100 to retransmit a packet for which decoding fails.

In operation S760, the reception device 200 may perform decoding again by combining a retransmitted packet and a decoding failed packet. In other words, the reception device 200 may generate a reliable packet by soft combining the retransmitted packet and the decoding failed packet, and perform turbo decoding again on the reliable packet.

Figure 8:
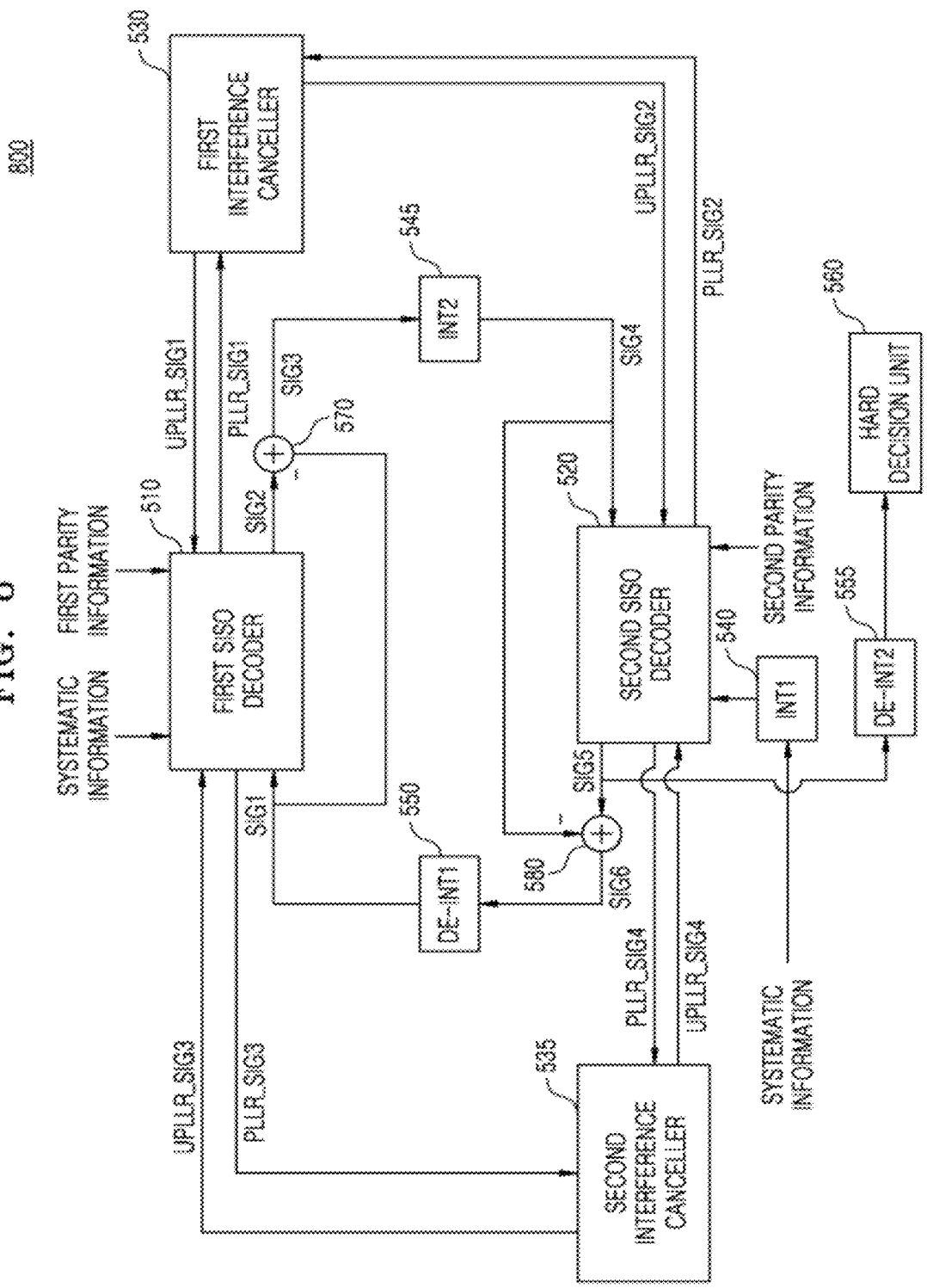
FIG. 8 is a block diagram of a turbo decoder including two interference cancellers, according to an embodiment.

FIG. 8 is a block diagram of a turbo decoder including two interference cancellers, according to an embodiment. Redundant description of components and operations of FIGS. 5 and 6 is omitted in the below discussion of FIG. 8.

Referring to FIG. 8, a turbo decoder 800 may further include a second interference canceller 535. The second interference canceller 535 may update a parity LLR. The updated parity LLR may be obtained by recalculating a parity LLR by canceling inter-layer interference. The second interference canceller 535 may receive a third parity LLR PLLR_SIG3 from a first SISO decoder 510 and receive a fourth parity LLR PLLR_SIG4 from a second SISO decoder 520. The second interference canceller 535 may calculate updated LLRs on the basis of PLLR_SIG3 and PLLR_SIG4, respectively. For example, the second interference canceller 535 may generate a third update parity LLR UPLLR_SIG3 and provide LLR UPLLR_SIG3 to the first SISO decoder 510, and may generate a fourth update parity LLR UPLLR_SIG4 and provide UPLLR_SIG4 to the second SISO decoder 520. The first SISO decoder 510 may use a first update parity LLR UPLLR_SIG1 received from a first interference canceller 530 when generating a first post-LLR SIG2 in a previous iteration, and may use the third parity LLR_UIG3 received from the second interference canceller 535 when generating the first post-LLR SIG2 in a next iteration. The second SISO decoder 520 may use a second update parity LLR UPLLR_SIG2 received from the first interference canceller 530 when generating a second post-LLR SIGS in a previous iteration, and may use the fourth update parity LLR UPLLR_SIG4 received from the second interference canceller 535 when generating the second post-LLR SIGS in a next iteration.

Figure 9A:
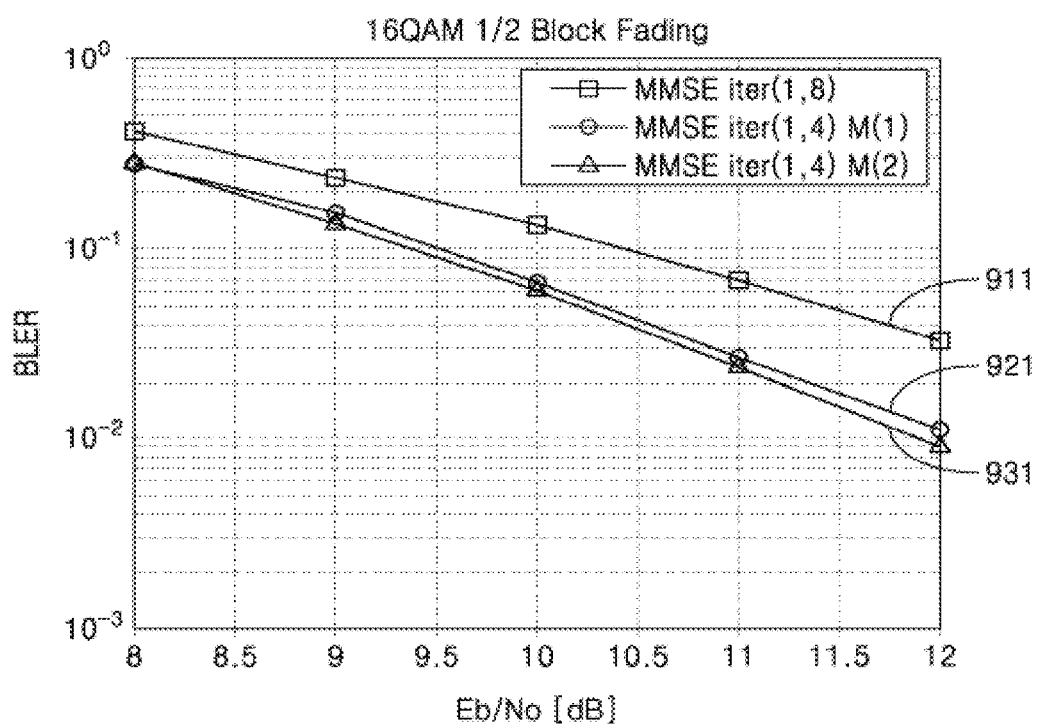
FIG. 9A is a graph illustrating an improvement in a block error rate, according to an embodiment.

FIG. 9A is a graph illustrating an improvement in a block error rate (BLER) vs. Eb/No (a normalized signal to noise ratio) according to an embodiment. A first result 911 illustrates a related art performance result when a "global iteration" is performed once and a turbo decoding iteration is performed eight times. In the global iteration, the MIMO detector 210 cancels inter-layer interference by using an output of the turbo decoder 220, iteratively calculates an LLR and provides the calculated LLR to the turbo decoder 220.

A second result 921 illustrates a performance result when a global iteration is performed once and a turbo decoding iteration is performed four times, according to an embodiment. Here, the turbo decoder 500 (first example of turbo decoder 220) may include only one interference canceller 530 with reference to FIG. 5. For example, the second result 921 is a performance result when interference cancellation is performed only once between the first SISO decoder 510 and the second SISO decoder 520. A third result 931 illustrates a performance result when a global iteration is performed once and a turbo decoding iteration is performed four times, according to an embodiment, and the turbo decoder 800 (second example of turbo decoder 220) may include two interference cancellers 530 and 535 with reference to FIG. 8. For example, the third result 931 illustrates a performance result when performing interference cancellation twice by performing interference cancellation once in a process of inputting an output LLR of the first SISO decoder 510 as an input LLR of the second SISO decoder 520 and performing interference cancellation again in a process of inputting an output LLR of the second SISO decoder 520 as an input LLR of the first SISO decoder 510.

When comparing the performance results of the first result 911, the second result 921, and the third result 931, a performance improvement of about 1 dB may be obtained by performing, on the basis of the same block error rate, interference cancellation at least once between the first SISO decoder 510 and the second SISO decoder 520.

Figure 9B:
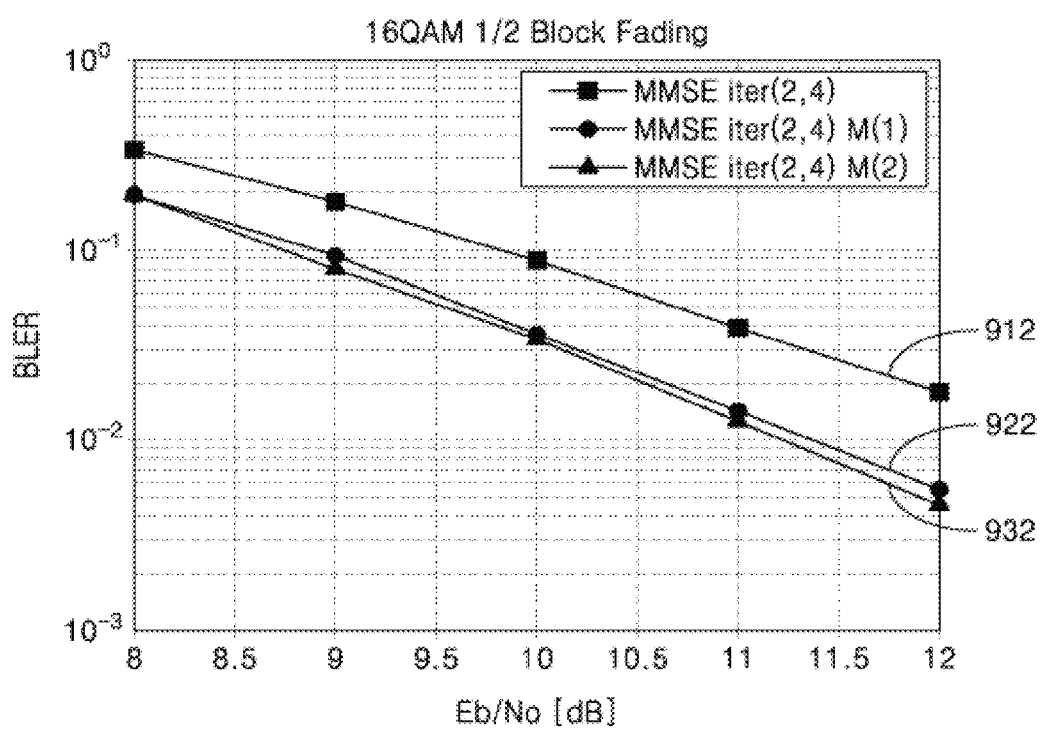
FIG. 9B is another graph illustrating an improvement in a block error rate, according to an embodiment.

FIG. 9B is another graph illustrating an improvement in a block error rate according to an embodiment. A first result 912 illustrates a performance result when a related art global iteration is performed two times and a turbo decoding iteration is performed eight times. A second result 922 illustrates a performance result when a global iteration is performed two times and a turbo decoding iteration is performed four times with the turbo coder 500 of FIG. 5 (employing one interference canceller 530). The second result 922 is a performance result when interference cancellation is performed only once between the first SISO decoder 510 and the second SISO decoder 520. A third result 932 illustrates a performance result when a global iteration is performed two times and a turbo decoding iteration is performed four times, according to an embodiment. Here, the turbo decoder 800 may include two interference cancellers 530 and 535 with reference to FIG. 8. For example, the third result 932 illustrates a performance result when performing interference cancellation twice by performing interference cancellation once in a process of inputting an output LLR of the first SISO decoder 510 as an input LLR of the second SISO decoder 520 and performing interference cancellation again in a process of inputting an output LLR of the second SISO decoder 520 as an input LLR of the first SISO decoder 510.

When comparing the performance results of the first result 912, the second result 922, and the third result 932, a performance improvement of about 1.5 dB may be obtained by performing, on the basis of the same block error rate, interference cancellation at least once between the first SISO decoder 510 and the second SISO decoder 520.

Figure 10:
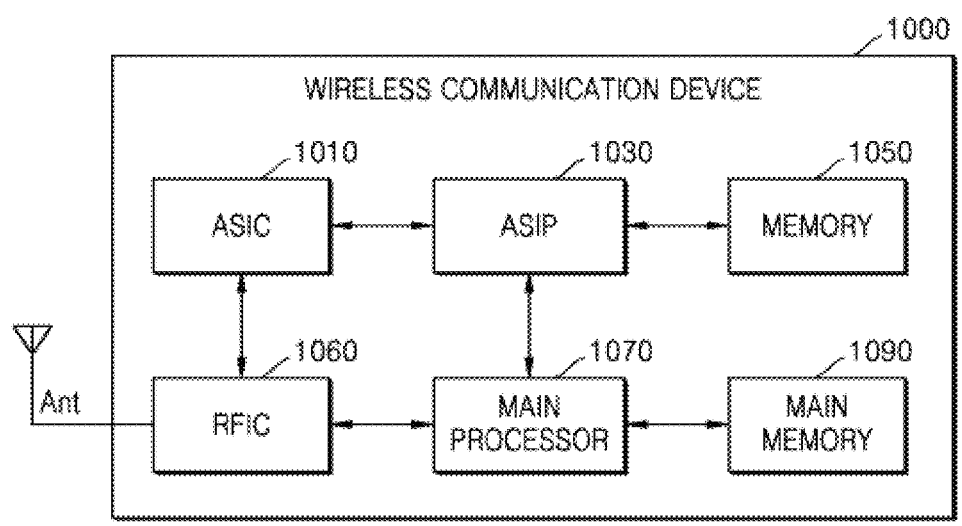
FIG. 10 is a block diagram of a wireless communication device according to an embodiment.

FIG. 10 is a block diagram of a wireless communication device, 1000, according to an embodiment. Device 1000 may include a modem (not shown) and a radio frequency integrated circuit (RFIC) 1060, and the modem may include an application specific integrated circuit (ASIC) 1010, an application specific instruction set processor (ASIP) 1030, a memory 1050, a main processor 1070, and a main memory 1090. The wireless communication device 1000 of FIG. 10 may be the reception device 200 of FIG. 1 or the reception device 200 of FIG. 2, according to an embodiment.

The RFIC 1060 may be connected to an antenna Ant to receive a signal from the outside or transmit a signal to the outside by using a wireless communication network. The ASIP 1030 may be an integrated circuit customized for a particular purpose, may support a dedicated instruction set for a particular application, and may execute instructions included in the instruction set. The memory 1050 may communicate with the ASIP 1030, and may also store, as a non-transitory storage device, a plurality of instructions executed by the ASIP 1030. For example, the memory 1050 may include, as a non-limiting example, any type of memory accessible by the ASIP 1030, such as random access memory (RAM), read only memory (ROM), tape, a magnetic disk, an optical disk, volatile memory, nonvolatile memory, and a combination thereof.

The main processor 1070 may control the wireless communication device 1000 by executing a plurality of instructions. For example, the main processor 1070 may control the ASIC 1010 and the ASIP 1030, may process data received through the wireless communication network, or may process an input of a user to the wireless communication device 1000.

The main memory 1090 may communicate with the main processor 1070, and may store, as a non-transitory storage device, a plurality of instructions executed by the main processor 1070. For example, the main memory 1090 may include, as a non-limiting example, any type of memory accessible by the main processor 1070, such as RAM, ROM, tape, a magnetic disk, an optical disk, volatile memory, nonvolatile memory, and a combination thereof.

Embodiments have been disclosed in the drawings and description as described above. Although the embodiments have been described by using particular terms herein, the terms are used only for the purpose of describing the spirit of the inventive concept and are not used to limit the meaning or the scope of the inventive concept defined by claims. While the inventive concept has been particularly shown and described with reference to embodiments thereof, it will be understood that various changes in form and details may be made therein without departing from the spirit and scope of the following claims.

What is claimed is:

1. A turbo decoder comprising:
   a first soft input soft output (SISO) decoder configured to receive systematic information, first parity information, and a first pre-log likelihood ratio (pre-LLR), and to output a first parity log likelihood ratio (LLR) obtained by calculating an LLR for the first parity information;
   an interleaver configured to interleave the systematic information;
   a second SISO decoder configured to receive an output of the interleaver, second parity information, and a second pre-LLR, and to output a second parity LLR obtained by calculating an LLR for the second parity information; and
   an interference canceller configured to receive the first parity LLR from the first SISO decoder, receive the second parity LLR from the second SISO decoder, and calculate a first update parity LLR and a second update parity LLR, wherein the turbo decoder uses the first and second update parity LLRs to derive decoded output data corresponding to the systematic information.

2. The turbo decoder of claim 1, wherein the first SISO decoder further outputs a first post-LLR, and the turbo decoder further comprises a subtractor configured to subtract the first pre-LLR from the first post-LLR to thereby obtain a first extrinsic LLR.

3. The turbo decoder of claim 1, wherein the interference canceller is further configured to generate the first and second update parity LLRs based on cancellation of inter-layer interference in a multi input multi output (MIMO) channel, provide the first update parity LLR to the first SISO decoder, and provide the second update parity LLR to the second SISO decoder.

4. The turbo decoder of claim 3, wherein the first SISO decoder is further configured to calculate a first post-LLR on the basis of the first update parity LLR, the systematic information, and the first pre-LLR, and
the second SISO decoder is further configured to calculate a second post-LLR on the basis of the second update parity LLR, the output of the interleaver, and the second pre-LLR.

5. The turbo decoder of claim 4, wherein the interleaver is a first interleaver, the turbo decoder further includes a second interleaver, the first pre-LLR is obtained by de-interleaving, via a first de-interleaver, a second extrinsic LLR obtained by subtracting the second pre-LLR from the second post-LLR, and
the second pre-LLR is obtained by interleaving, via the second interleaver, a first extrinsic LLR obtained by subtracting the first pre-LLR from the first post-LLR.

6. The turbo decoder of claim 5, further comprising a second de-interleaver configured to de-interleave the second post-LLR which is an output of the second SISO decoder, wherein the turbo decoder is configured to generate a decoded signal representing the output data by performing a hard decision on the basis of an output of the second de-interleaver.

7. A turbo decoder comprising:
a first soft input soft output (SISO) decoder configured to receive systematic information, first parity information, and a first pre-log likelihood ratio (pre-LLR), and to output a first parity LLR obtained by calculating a log likelihood ratio (LLR) for the first parity information;
an interleaver configured to interleave the systematic information;
a second SISO decoder configured to receive an output of the first-interleaver, second parity information, and a second pre-LLR, and to output a second parity LLR obtained by calculating an LLR for the second parity information;
a first interference canceller configured to receive the first parity LLR from the first SISO decoder, receive the second parity LLR from the second SISO decoder, and calculate a first update parity LLR and a second update parity LLR; and
a second interference canceller configured to receive the first parity LLR from the first SISO decoder, receive the second parity LLR from the second SISO decoder, and calculate a third update parity LLR and a fourth update parity LLR,
wherein the turbo decoder uses the first through fourth update parity LLRs to derive decoded output data corresponding to the systematic information.

8. The turbo decoder of claim 7, wherein the first SISO decoder further outputs a first post-LLR, and the turbo decoder further comprises a first subtractor configured to subtract the first pre-LLR from the first post-LLR to generate a first extrinsic LLR, and
the second SISO decoder further outputs a second post-LLR, and the turbo decoder further comprises a second subtractor configured to subtract the second pre-LLR, which is an input of the second SISO decoder, from the second post-LLR to generate a second extrinsic LLR.

9. The turbo decoder of claim 7, wherein the first interference canceller is further configured to generate the first and second update parity LLRs based on cancellation of inter-layer interference in a multi input multi output (MIMO) channel, provide the first update parity LLR to the first SISO decoder, and provide the second update parity LLR to the second SISO decoder, and
the second interference canceller is further configured to generate the third and fourth update parity LLRs based on cancellation of inter-layer interference in the MIMO channel, provide the third update parity LLR to the first SISO decoder, and provide the fourth update parity LLR to the second SISO decoder.

10. The turbo decoder of claim 9, wherein the first SISO decoder is further configured to calculate a first post-LLR on the basis of the first update parity LLR, the third update parity LLR, the systematic information, and the first pre-LLR,
the second SISO decoder is further configured to calculate a second post-LLR on the basis of the second update parity LLR, the fourth update parity LLR, the output of the first interleaver, and the second pre-LLR.

11. The turbo decoder of claim 10, wherein the interleaver is a first interleaver, the turbo decoder further comprises a second interleaver, the first pre-LLR is obtained by de-interleaving, via a first de-interleaver, a second extrinsic LLR obtained by subtracting the second pre-LLR from the second post-LLR, and
the second pre-LLR is obtained by interleaving, via the second interleaver, a first extrinsic LLR obtained by subtracting the first pre-LLR from the first post-LLR.

12. The turbo decoder of claim 9, wherein the first SISO decoder is further configured to output a first post-LLR on the basis of the third update parity LLR, the systematic information, and the first pre-LLR.

13. An operating method of a turbo decoder included in a reception device and comprising a first soft input soft output (SISO) decoder, a second SISO decoder, and an interference canceller, the operating method comprising:
receiving, by the first SISO decoder, first parity information, first systematic information, and a first pre-log likelihood ratio (LLR);
providing, to the interference canceller by the first SISO decoder, a first parity LLR generated by calculating an LLR for the first parity information;
providing, to the interference canceller by the second SISO decoder, a second parity LLR generated by calculating an LLR for second parity information on the basis of received second parity information and second systematic information;
obtaining a first extrinsic LLR by subtracting the first pre-LLR from a first post-LLR which is an output of the first SISO decoder;
generating, by the interference canceller, a first update parity LLR and a second update parity LLR on the basis of the first parity LLR and the second parity LLR; and
providing, by the interference canceller, the first update parity LLR to the first SISO decoder and providing the second update parity LLR to the second SISO decoder.

14. The operating method of claim 13, further comprising obtaining, by the second SISO decoder, a second extrinsic LLR by subtracting a second pre-LLR from a second post-LLR.

15. The operating method of claim 14, further comprising:
de-interleaving the second extrinsic LLR; and
providing the de-interleaved second extrinsic LLR as the first pre-LLR to the first SISO decoder.

16. The operating method of claim 14, further comprising:
interleaving the first extrinsic LLR; and
providing the interleaved first extrinsic LLR as the second pre-LLR to the second SISO decoder.

17. The operating method of claim 16, further comprising calculating, by the second SISO decoder, a second post-LLR on the basis of the second pre-LLR, the second update parity LLR, and the second systematic information.

18. The operating method of claim 17, further comprising:
de-interleaving the second extrinsic LLR; and
performing hard decision decoding on the basis of the de-interleaved second post-LLR.

19. The operating method of claim 18, further comprising:
performing a cyclic redundancy check (CRC) on the basis of a result of the hard decision decoding;
when a result of the CRC is a fail, determining whether or not a maximum number of iterations is exceeded; and
when the maximum number of iterations is exceeded, requesting retransmission.

20. The operating method of claim 14, wherein the second systematic information is obtained by interleaving the first systematic information.

\* \* \* \* \*